(12) United States Patent
Bysted et al.

(10) Patent No.: US 7,848,304 B2
(45) Date of Patent: Dec. 7, 2010

(54) TRANSMITTING INTERLEAVED MULTIPLE DATA FLOWS

(75) Inventors: Tommy Kristensen Bysted, Smoerm (DK); Kent Pedersen, Frederiksberg (DK); Benoist Sebire, Dajie (CN)

(73) Assignee: Nokia Corporation, Espoo (FI)

( * ) Notice: Subject to any disclaimer, the term of this patent is extended or adjusted under 35 U.S.C. 154(b) by 1123 days.

(21) Appl. No.: 10/523,616

(22) PCT Filed: Aug. 1, 2002

(86) PCT No.: PCT/EP02/08587

§ 371 (c)(1),
(2), (4) Date: Nov. 23, 2005

(87) PCT Pub. No.: WO02/093817

PCT Pub. Date: Nov. 21, 2002

(65) Prior Publication Data

US 2006/0126591 A1 Jun. 15, 2006

(51) Int. Cl.
*H04J 3/00* (2006.01)
(52) U.S. Cl. ............... 370/345; 370/346; 370/347; 370/326; 370/336
(58) Field of Classification Search ............... 370/345, 370/346, 347, 326, 336
See application file for complete search history.

(56) References Cited

U.S. PATENT DOCUMENTS

| 6,088,345 | A | * | 7/2000 | Sakoda et al. | 370/335 |
| 7,133,441 | B1 | * | 11/2006 | Barlev et al. | 375/222 |
| 2002/0071407 | A1 | | 6/2002 | Koo et al. | 370/335 |

FOREIGN PATENT DOCUMENTS

| EP | 1 009 174 A2 | 6/2000 |
| WO | 0039595 | 7/2000 |
| WO | 0178323 A2 | 10/2001 |
| WO | 0217549 A2 | 2/2002 |
| WO | 0239595 A2 | 5/2002 |
| WO | WO 02/093817 A1 | 11/2002 |

OTHER PUBLICATIONS

3rd Generation Partnership Project (3GPP); Technical Specification Group (TSG) Radio Access Network (RAN); Working Group 1 (WG1); Multiplexing and channel coding (FDD), TS 25.212 V2.0.0 (Jun. 1999), pp. 1-38.

* cited by examiner

*Primary Examiner*—Lester Kincaid
*Assistant Examiner*—Sayed T Zewari
(74) *Attorney, Agent, or Firm*—Perman & Green LLP

(57) ABSTRACT

Multiple transport channels (405, 406, 407) are multiplexed and transmitted in a single physical channel. A code (TFCI) is added to the transport channel data flows to indicate which processing schemes, from a set of available schemes, are being employed and the resultant blocks are interleaved. The depth of the interleaving is set in dependence on the transmission time intervals associated with the schemes in the set of processing schemes.

14 Claims, 12 Drawing Sheets

US 7,848,304 B2

TRANSMITTING INTERLEAVED MULTIPLE DATA FLOWS

This application is the National Stage of International Application No. PCT/EP2002/008587, International Filing Date, 1 Aug. 2002, which designated the United States of America, and which international application was published under PCT Article 21(2) as WO Publication No. WO 2004/015909.

FIELD OF THE INVENTION

The present invention relates to a communication system.

BACKGROUND TO THE INVENTION

The concept of transport channels is known from UTRAN (Universal mobile Telecommunications System Radio Access Network). Each of these transport channels can carry a bit class having a different quality of service (QoS) requirement. A plurality of transport channels can be multiplexed and sent in the same physical channel.

Only certain combinations of transport channel formats are possible within the bandwidth constraints of the system. The combination currently being used can be indicated by a code embedded in the transmitted data. This code may be mapped onto a predetermined chunk of data, e.g. four bursts in a TDMA mobile phone system. As a consequence, diagonal interleaving becomes difficult.

SUMMARY OF THE INVENTION

According to the present invention, there is provided a method of transmitting a block of digital data, the method comprising:
  processing first and second data flows in first and second manners to produce first and second processed data flows;
  concatenating data from the first and second processed data flows and a code identifying said manners to produce a block of concatenated data;
  interleaving said block; and
  transmitting said block.

Preferably, the method includes establishing data representing a set of processing manners, said data defining a block size and a transmission time therefore for each processing manner, and the depth of said interleaving corresponds to a transmission time not greater than the least of said defined transmission times.

According to the present invention, there is also provided a method of transmitting a block of digital data, the method comprising:
  establishing data representing a set of processing manners, said data defining a block size and a transmission time therefor for each processing manner,
  processing at least one data flow, the or each data flow being processed according to manners selected from said set of processing manners;
  concatenating data from the or each data flow and a code identifying said selected manner or manners to produce a block of concatenated data;
  interleaving said block; and
  transmitting said block,
  wherein the depth of said interleaving corresponds to a transmission time not greater than the least of said defined transmission times.

Preferably, said defined transmission times are integer multiples of the transmission time corresponding to said interleaving depth. The interleaving depth preferably corresponds to the shortest transmission time of the set but is may be the largest common divisor of the transmission times of the set.

More preferably, a method according to the present invention includes receiving a signal defining said set of processing manners. Yet more preferably, the method includes storing data representing a plurality of processing manners and selecting from said stored data in response to said signal defining said set of processing manners.

More preferably, each processing manner includes an interleaving process definition. Yet more preferably, interleaving according to an interleaving process definition is only performed if the transmission time of the same processing manner is greater than the least of the transmission times of said set.

Preferably, said block is transmitted by radio waves.

According to the present invention, there is also provided a transmitter for transmitting blocks of digital data, the transmitter comprising processing means configured to:
  process first and second data flows in first and second manners to produce first and second processed data flows,
  concatenate data from the first and second processed data flows and a code identifying said manners to produce a block of concatenated data, and interleave said block; and
  transmitting circuitry for transmitting said block.

Preferably, the processing means includes a memory storing data representing a set of processing manners, said data defining a block size and a transmission time therefor for each processing manner, and the processing means is configured such that the depth of said interleaving corresponds to a transmission time not greater than the least of said defined transmission times.

According to the present invention, there is provided a transmitter for transmitting blocks of digital data, the transmitter comprising processing means including a memory storing data representing a set of processing manners, said data defining a block size and a transmission time therefor for each processing manner, wherein the processing means is configured to:
  process at least one data flow, the or each data flow being processed according to manners selected from said set of processing manners;
  concatenate data from the or each data flow and a code identifying said selected manner or manners to produce a block of concatenated data;
  interleave said block; and
  transmit said block,
wherein the depth of said interleaving corresponds to a transmission time not greater than the least of said defined transmission times.

Preferably, said defined transmission times are integer multiples of the transmission time corresponding to said interleaving depth.

Preferably, a transmitter according to the present invention includes a receiving means for receiving a signal defining said set of processing manners. More preferably, the processing means includes a memory storing data representing a plurality of processing manners and the processing means is configured for selecting from said stored data in response to said signal defining said set of processing manners.

Preferably, each processing manner includes an interleaving process definition. More preferably, the processing means is configured such that the interleaving according to an interleaving process definition is only performed if the transmission time of the same processing manner is greater than the least of the transmission times of said set.

Preferably, the transmitter circuitry comprises radio transmitter circuitry, making it suitable for use in a mobile phone or a base station of a mobile phone network.

DETAILED DESCRIPTION OF THE PREFERRED EMBODIMENT

A preferred embodiment of the present invention will now be described, by way of example, with reference to the accompanying drawings.

Figure 1:
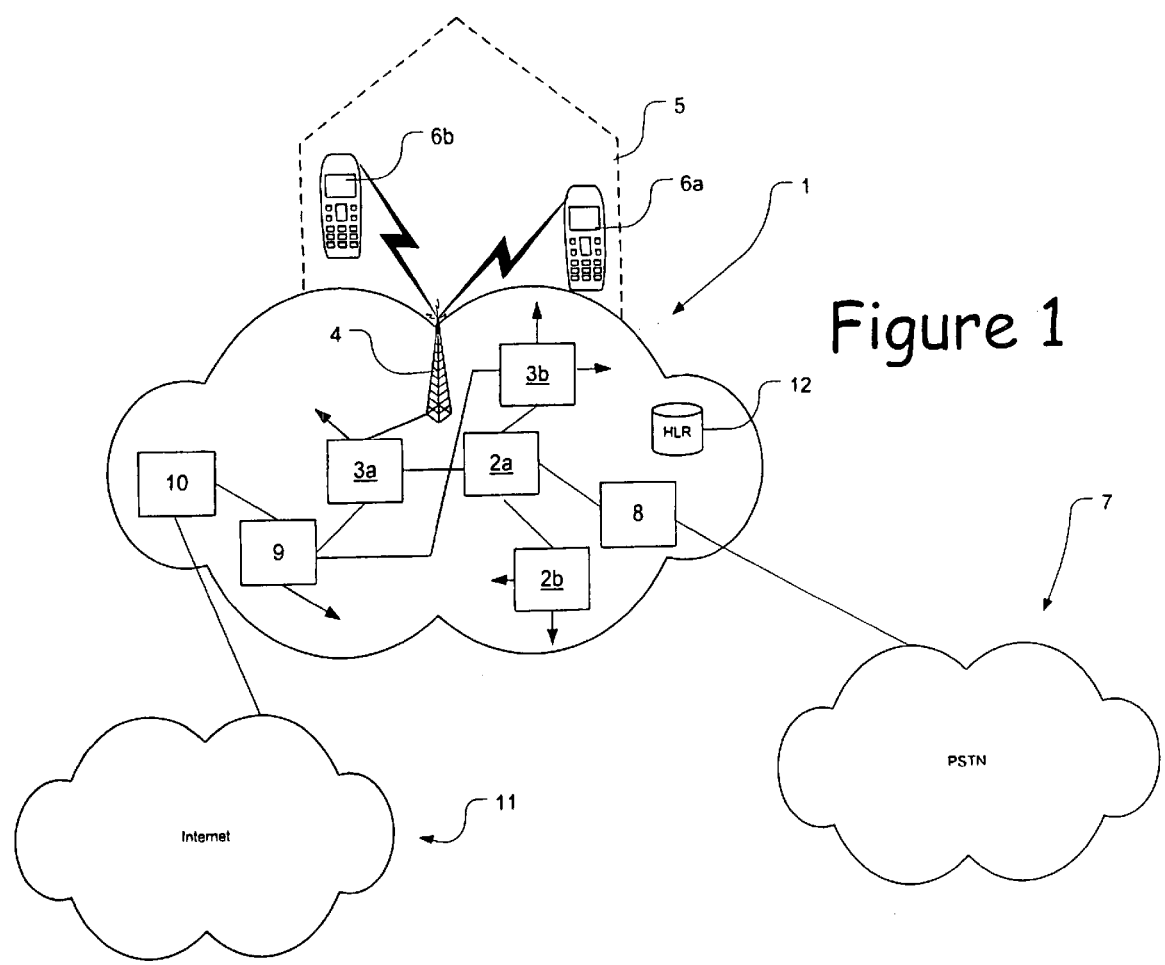
FIG. 1 shows a mobile communication system according to the present invention.

Referring to FIG. 1, a mobile phone network 1 comprises a plurality of switching centres including first and second switching centres 2a, 2b. The first switching centre 2a is connected to a plurality of base station controllers including first and second base station controllers 3a, 3b. The second switching centre 2b is similarly connected to a plurality of base station controllers (not shown).

The first base station controller 3a is connected to and controls a base transceiver station 4 and a plurality of other base transceiver stations. The second base station controller 3b is similarly connected to and controls a plurality of base transceiver stations (not shown).

In the present example, each base transceiver station services a respective cell. Thus, the base transceiver station 4 services a cell 5. However, a plurality of cells may be serviced by one base transceiver station by means of directional antennas. A plurality of mobile stations 6a, 6b are located in the cell 5. It will be appreciated that the number and identities of mobile stations in any given cell will vary with time.

The mobile phone network 1 is connected to a public switched telephone network 7 by a gateway switching centre 8.

A packet service aspect of the network includes a plurality of packet service support nodes (one shown) 9 which are connected to respective pluralities of base station controllers 3a, 3b. At least one packet service support gateway node 10 connects the or each packet service support node 10 to the Internet 11.

The switching centres 3a, 3b and the packet service support nodes 9 have access to a home location register 12.

Communication between the mobile stations 6a, 6b and the base transceiver station 4 employs a time-division multiple access (TDMA) scheme.

Figure 2:
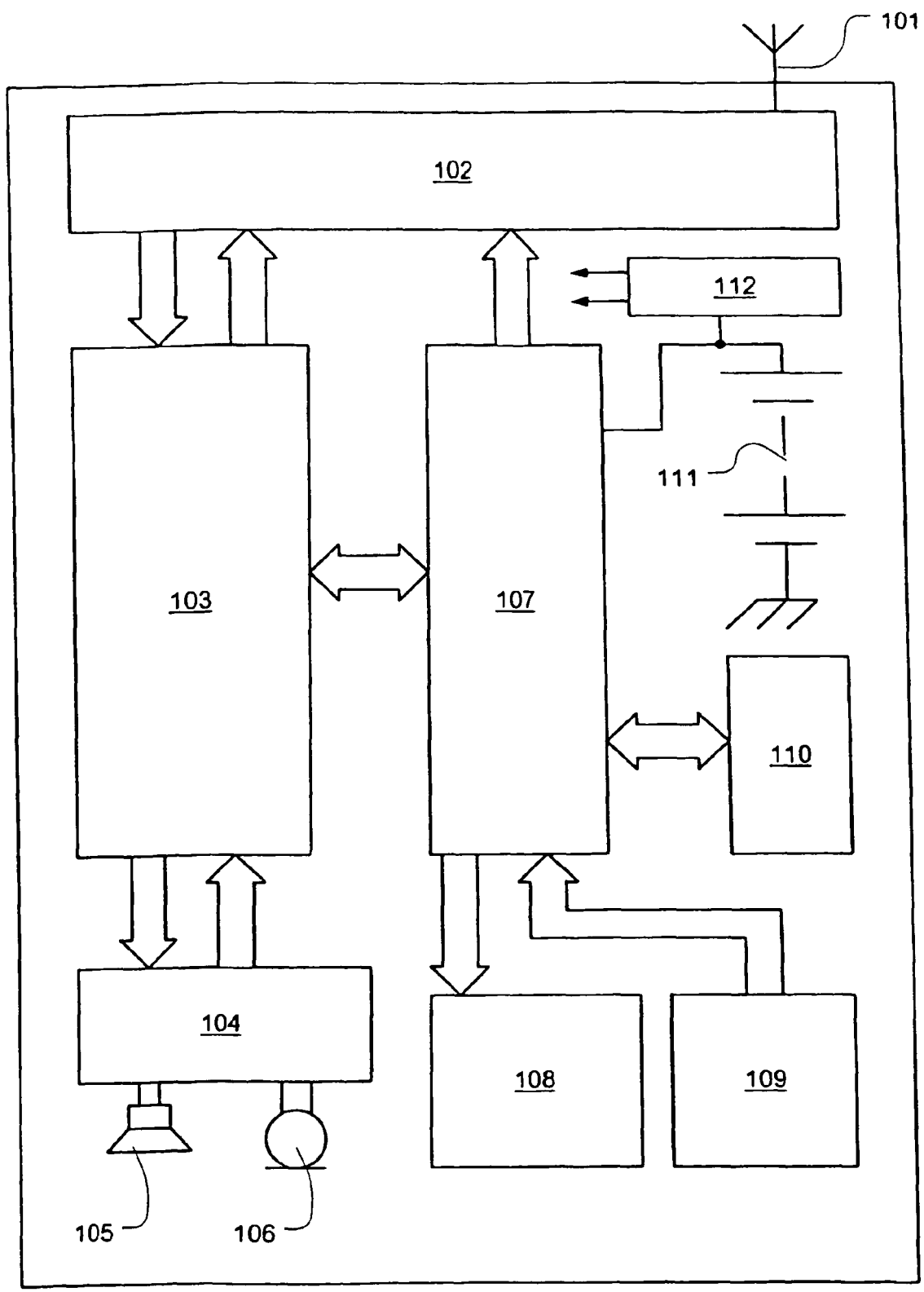
FIG. 2 is a block diagram of a mobile station.

Referring to FIG. 2, the first mobile station 6a comprises an antenna 101, an rf subsystem 102, baseband DSP (digital signal processing) subsystem 103, an analogue audio subsystem 104, a loudspeaker 105, a microphone 106, a controller 107, a liquid crystal display 108, a keypad 109, memory 110, a battery 111 and a power supply circuit 112.

The rf subsystem 102 contains if and rf circuits of the mobile telephone's transmitter and receiver and a frequency synthesizer for tuning the mobile station's transmitter and receiver. The antenna 101 is coupled to the rf subsystem 102 for the reception and transmission of radio waves.

The baseband DSP subsystem 103 is coupled to the rf subsystem 102 to receive baseband signals therefrom and for sending baseband modulation signals thereto. The baseband DSP subsystems 103 includes codec functions which are well-known in the art.

The analogue audio subsystem 104 is coupled to the baseband DSP subsystem 103 and receives demodulated audio therefrom. The analogue audio subsystem 104 amplifies the demodulated audio and applies it to the loudspeaker 105. Acoustic signals, detected by the microphone 106, are pre-amplified by the analogue audio subsystem 104 and sent to the baseband DSP subsystem 4 for coding.

The controller 107 controls the operation of the mobile telephone. It is coupled to the rf subsystem 102 for supplying tuning instructions to the frequency synthesizer and to the baseband DSP subsystem 103 for supplying control data and management data for transmission. The controller 107 operates according to a program stored in the memory 110. The memory 110 is shown separately from the controller 107. However, it may be integrated with the controller 107.

The display device 108 is connected to the controller 107 for receiving control data and the keypad 109 is connected to the controller 107 for supplying user input data signals thereto.

The battery 111 is connected to the power supply circuit 112 which provides regulated power at the various voltages used by the components of the mobile telephone.

The controller 107 is programmed to control the mobile station for speech and data communication and with application programs, e.g. a WAP browser, which make use of the mobile station's data communication capabilities.

The second mobile station 6b is similarly configured.

Figure 3:
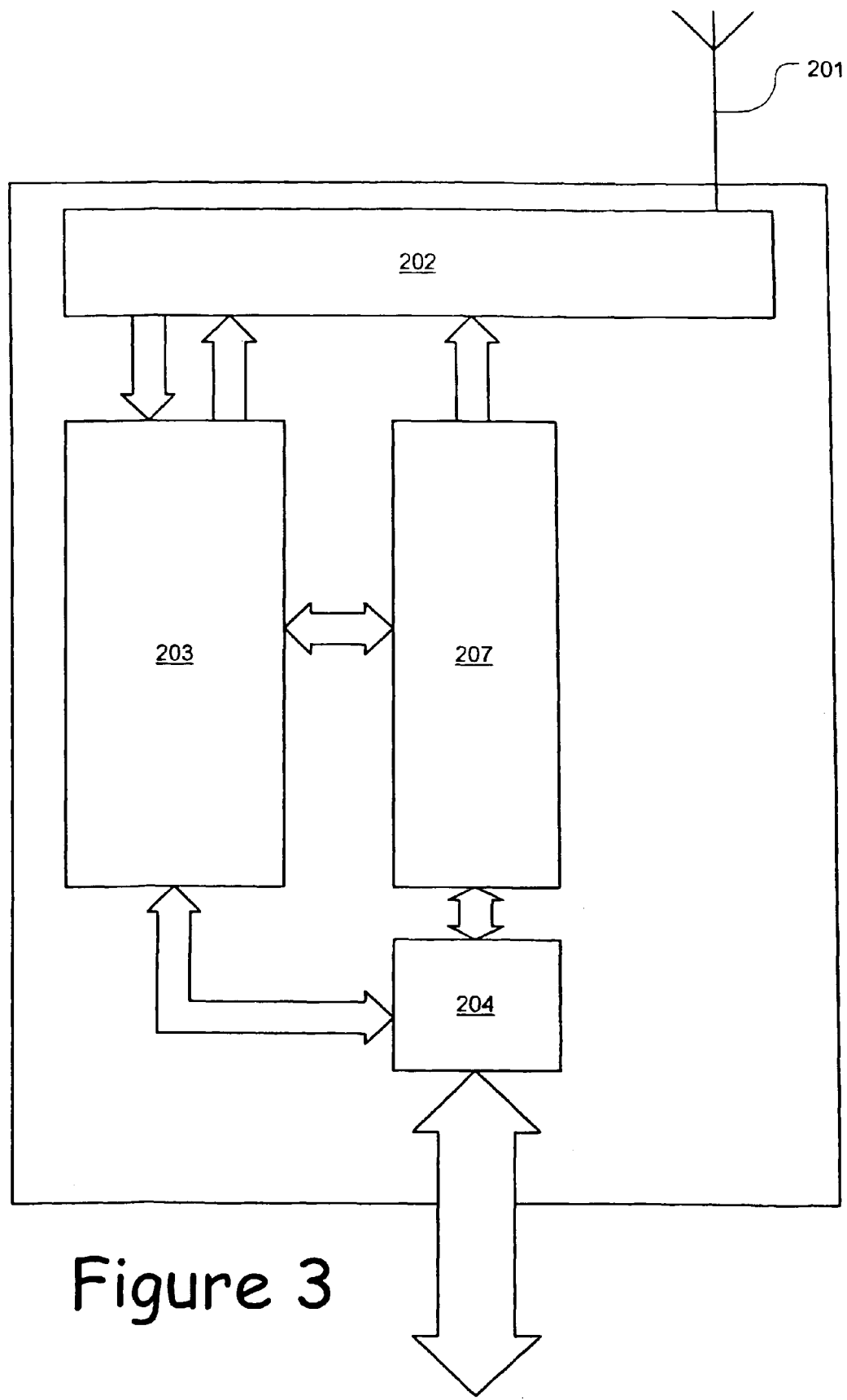
FIG. 3 is a block diagram of a base transceiver station.

Referring to FIG. 3, greatly simplified, the base transceiver station 4 comprises an antenna 201, an rf subsystem 202, a baseband DSP (digital signal processing) subsystem 203, a base station controller interface 204 and a controller 207.

The rf subsystem 202 contains the if and rf circuits of the base transceiver station's transmitter and receiver and a frequency synthesizer for tuning the base transceiver station's transmitter and receiver. The antenna 201 is coupled to the rf subsystem 202 for the reception and transmission of radio waves.

The baseband DSP subsystem 203 is coupled to the rf subsystem 202 to receive baseband signals therefrom and for sending baseband modulation signals thereto. The baseband DSP subsystems 203 includes codec functions which are well-known in the art.

The base station controller interface 204 interfaces the base transceiver station 4 to its controlling base station controller 3a.

The controller 207 controls the operation of the base transceiver station 4. It is coupled to the rf subsystem 202 for supplying tuning instructions to the frequency synthesizer and to the baseband DSP subsystem for supplying control data and management data for transmission. The controller 207 operates according to a program stored in the memory 210.

Figure 4:
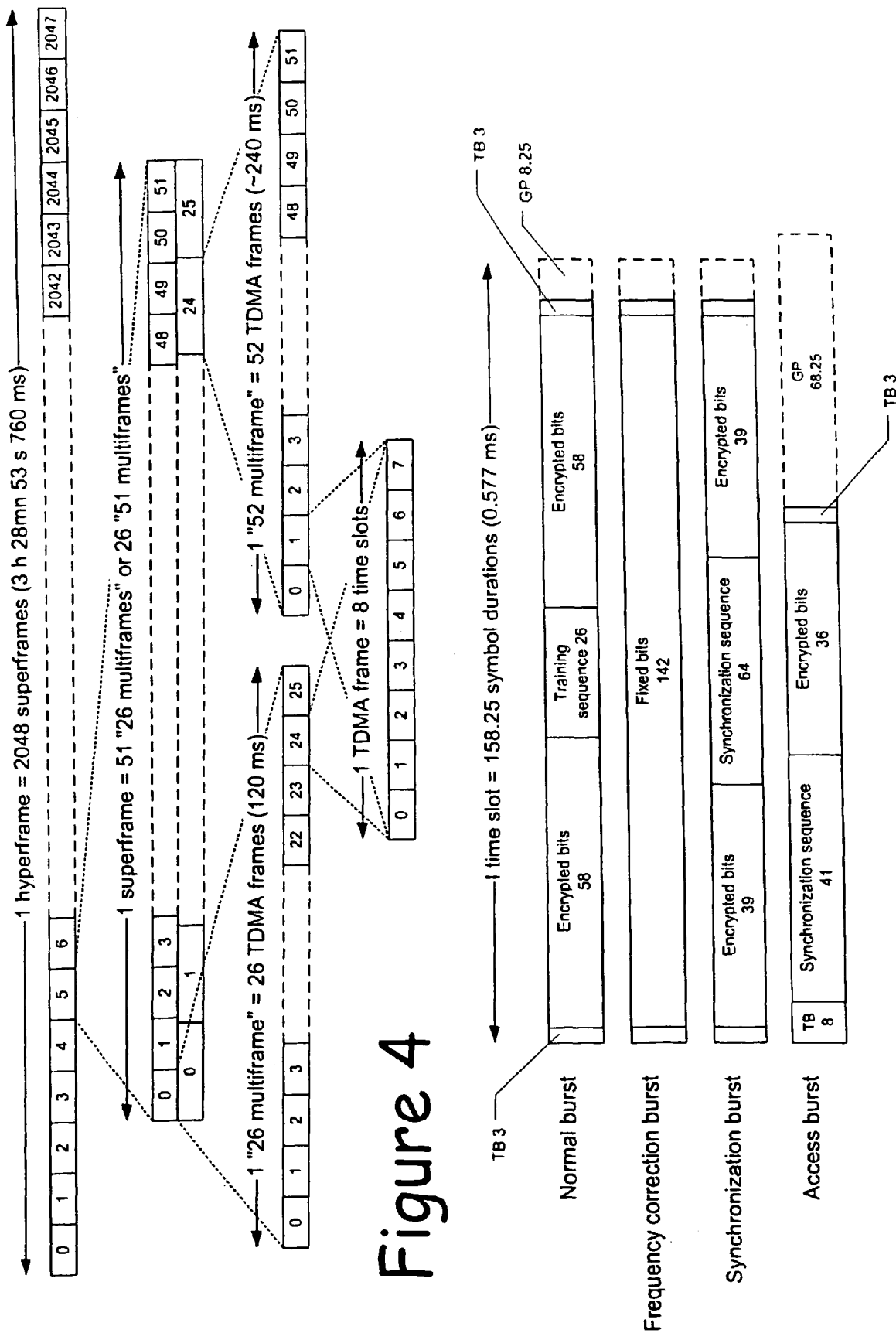
FIG. 4 illustrates the frame structure used in an embodiment of the present invention.

Referring to FIG. 4, each TDMA frame, used for communication between the mobile stations 6a, 6b and the base transceiver stations 4, comprises eight 0.577 ms time slots. A "26 multiframe" comprises 26 frames and a "51 multiframe" comprises 51 frames. Fifty one "26 multiframes" or twenty six "51 multiframes" make up one superframe. Finally, a hyperframe comprises 2048 super frames.

The data format within the time slots varies according to the function of a time slot. A normal burst, i.e. the physical content of a time slot, comprises three tail symbols, followed by 58 encrypted data symbols, a 26-symbol training sequence, another sequence of 58 encrypted data symbols and a further three tail symbols. A guard period of eight and a quarter symbols durations is provided at the end of the burst. For GMSK modulation 2 symbol is equivalent to a bit and for 8PSK modulation one symbol corresponds to three bits. A frequency correction burst has the same tail bits and guard period. However, its payload comprises a fixed 142 bit sequence. A synchronization burst is similar to the normal burst except that the encrypted data is reduced to two clocks of 39 bits and. the training sequence is replaced by a 64-bit synchronization sequence. Finally, an access burst comprises eight initial tail bits, followed by a 41-bit synchronization sequence, 36 bits of encrypted data and three more tail bits. In this case, the guard period is 68.25 bits long.

When used for circuit-switched speech traffic, the channelisation scheme is as employed in GSM.

Figure 5:
FIG. 5 illustrates a packet data channel in an embodiment of the present invention.

Referring to FIG. 5, full rate packet switched channels make use of 12 4-slot radio blocks spread over a "52 multiframe". Idle slots follow the third, sixth, ninth and twelfth radio blocks.

Figure 6:
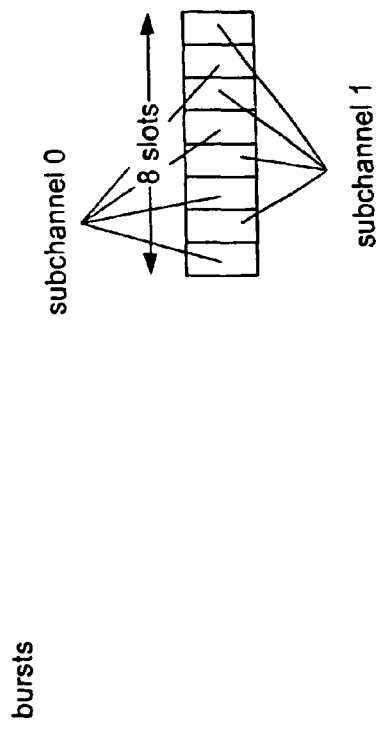
FIG. 6 illustrates the sharing of a radio channel between two half-rate packet channels in an embodiment of the present invention.

Referring to FIG. 6, for half rate, packet switched channels, both dedicated and shared, slots are allocated alternately to two sub-channels.

The baseband DSP subsystems 103, 203 and controllers 107, 207 of the mobile stations 6a, 6b and the base transceiver stations 4 are configured to implement two protocol stacks. The first protocol stack is for circuit switched traffic and is substantially the same as employed in conventional GSM systems. The second protocol stack is for packet switched traffic.

Figure 7:
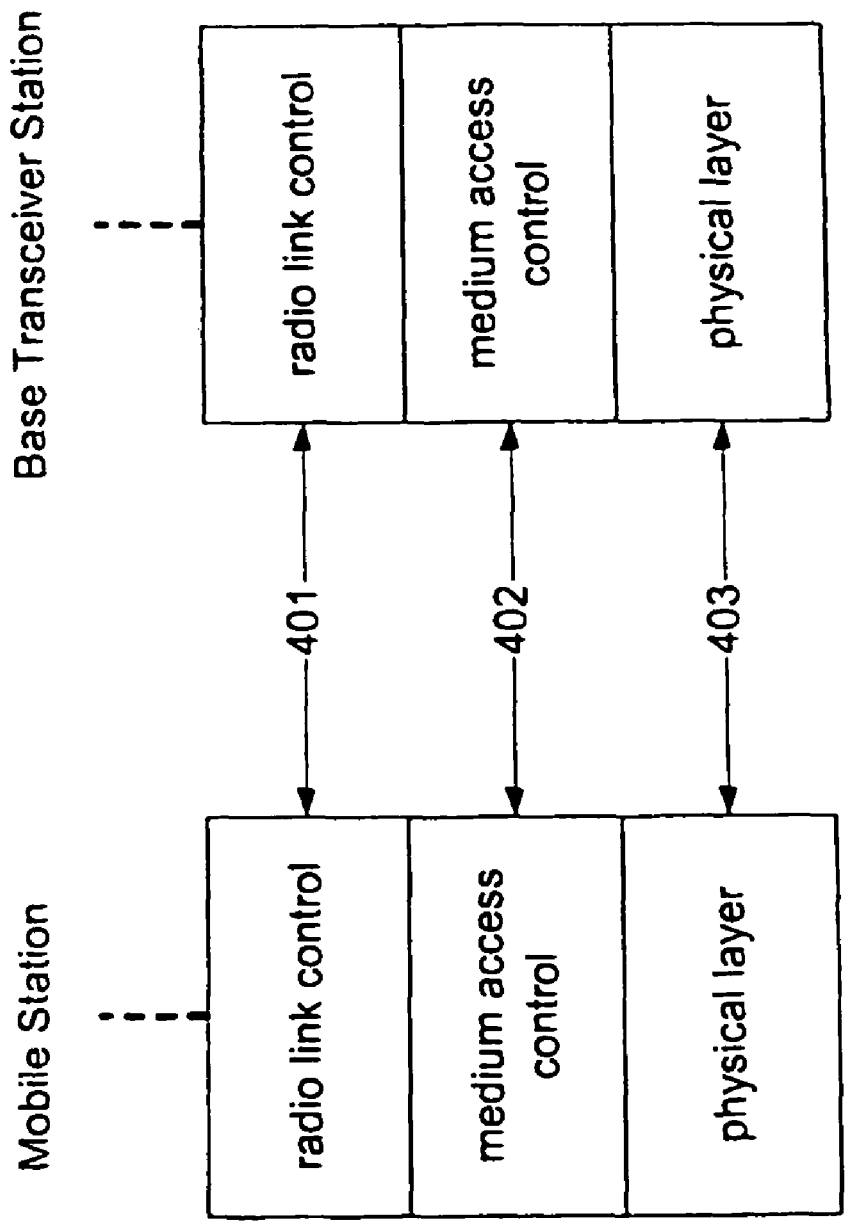
FIG. 7 illustrates the lower levels of a protocol stack used in an embodiment of the present invention.

Referring to FIG. 7, the layers of the second protocol stack 1, relevant to the radio link between a mobile station 6a, 6b and a base station controller 4, are the radio link control layer 401, the medium access control layer 402 and the physical layer 403.

The radio link control layer 401 has two modes: transparent and non-transparent. In transparent mode, data is merely passed up or down through the radio link control layer without modification.

In non-transparent mode, the radio link control layer 401 provides link adaptation and constructs data blocks from data units received from higher levels by segmenting or concatenating the data units as necessary and performs the reciprocal process for data being passed up the stack. It is also responsible for detecting lost data blocks and reordering data block for upward transfer of their contents, depending on whether acknowledged mode is being used. This layer may also provide backward error correction in acknowledged mode.

The medium access control layer 402 is responsible for allocating data blocks from the radio link control layer 401 to appropriate transport channels and passing received radio blocks from transport channels to the radio link control layer 403.

The physical layer 403 is responsible for creating transmitted radio signals from the data passing through the transport channels and passing received data up through the correct transport channel to the medium access control layer 402.

Transport blocks are exchanged between the medium access control layer 402 and the physical layer 403 in synchronism with the radio block timing.

Figure 8:
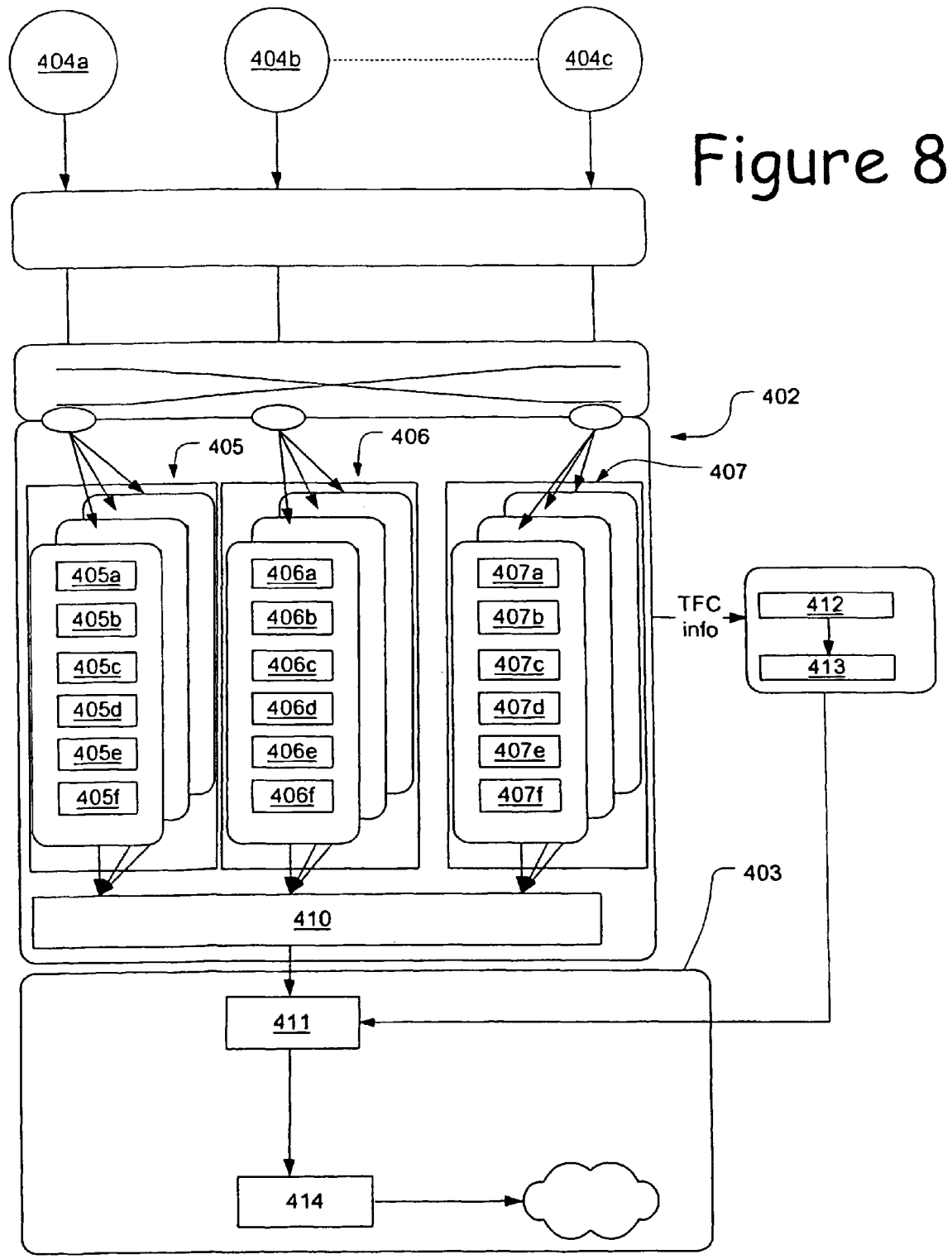
FIG. 8 illustrates the generation of a radio signal.

Referring to FIG. 8, data produced by applications 404a, 404b, 404c propagates down the protocol stack to the medium access control layer 402. The data from the applications 404a, 404b, 404c can belong to any of a plurality of classes for which different qualities of service are required. Data belonging to a plurality of classes may be produced by a single application. The medium access control layer 402 directs data from the applications 404a, 404b, 404c to different transport channels 405, 406, 407 according to the class to which it belongs.

Each transport channel 405, 406, 407 can be configured to process signals according to a plurality of processing schemes 405a, 405b, 405c, 406a, 406b, 406c, 407a, 407b, 407c. Definitions of available processing schemes 405a, 405b, 405c, 406a, 406b, 406c, 407a, 407b, 407c are stored in a memory of the controller 107, 207 of the station.

Figure 9:
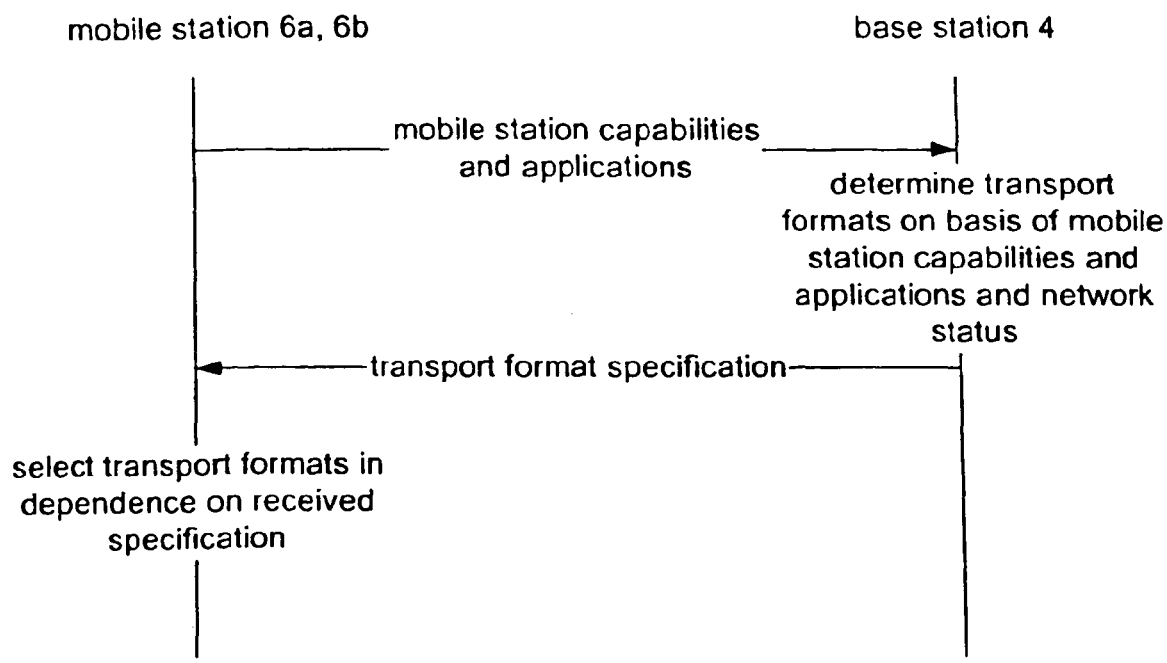
FIG. 9 illustrates call set up signalling relevant to the present invention.

Referring to FIG. 9, a set of processing schemes for the transport channels 405, 406, 407 is established by selecting from the stored definitions on the basis of the capabilities of the mobile station 6a, 6b and the network and the nature of the application or applications 404a, 404b, 404c being run. The mobile station 6a, 6b transmits its capabilities and applications to the base station 4 and the base station 4 determines the transport formats required and communicates these back to the mobile station 6a, 6b.

The processing schemes 405a, 405b, 405c, 406a, 406b, 406c, 407a, 407b, 407c are unique combinations of cyclic redundancy check 405a, 406a, 407a , channel coding 405b, 406b, 407b, radio frame equalizing 405c, 406c, 407c, transport channel interleaving 405d, 406d, 407d, segmentation 405e, 406e, 407e and rate matching 405f, 406f, 407f. These unique processing schemes will be referred to as "transport formats" and transport blocks processed according to a transport format will be referred to as coded transport blocks. The different transport channels can have different transport times intervals (TTIs) associated with them. The transport time interval is the reciprocal, i.e. the period, of the rate of transport block transfer from the medium access control layer to the physical layer. The transport time intervals are all integer multiples of the shortest transmission time interval in the transport channel format set established during call set up. The lower limit for this is the duration of one radio block which is a 20 ms in the present example.

Error detection is provided in each transport block through a CRC 405a, 406a, 407a. The size of the CRC to be used is fixed on each transport channel and configured by the radio link control layer. The entire transport block is used to calculate the CRC parity bits. The following CRC sizes could be used in order to fulfil the residual BER QoS requirements 0 (no error detection)
6 (for AMR mainly)
12 (as in GPRS)
24 (as in UTRAN)

The channel coding 405b, 406b, 407b to be used is chosen by the radio link control layer and can only be changed through higher layer signalling and can be considered to be fixed for each transport channel. This means that for AMR, the same mother code is used for all the modes, and rate matching adjusts the code rate by puncturing or repetition.

Radio frame size equalisation 405c, 406c, 407c comprises padding the input bit sequence in order to ensure that the coded transport block can be segmented in an integer number of data segments of the same size. It is only used when the transmission time interval is longer than the shortest transmission time interval in the transport channel format set established during call set up.

In practice, radio frame size equalisation 405c, 406c, 407c just adds a few dummy bits at the end of the coded transport block whenever needed. Taking for instance a coded transport block 1234567 and a transmission time interval of 80 ms and 20 ms radio blocks, one dummy bit is added at the end of the transport block in order to ensure that it can be divided in 4 segments (4 radio blocks of 20 ms): 12345678.

The transport channel interleaver 405d, 406d, 407d is a simple block interleaver with inter-column permutation. It is used when the transmission time interval is greater than the shortest transmission time interval in the transport channel format set established during call set up and is otherwise transparent. Its task is to ensure that no consecutive coded bits are transmitted in the same radio block.

When the transmission time interval is longer than shortest transmission time interval in the transport channel format set established during call set up ($TTI_{min}$), the input bit sequence is segmented and mapped onto n consecutive radio blocks (n=(transmission time interval)/$TTI_{min}$). Following radio frame size equalisation the input bit sequence length is guaranteed to be an integer multiple of n.

The rate matching means that coded bits in a transport channel are repeated or punctured. Higher layers assign a rate-matching attribute for each transport channel. This attribute is semi-static and can only be changed through higher layer signalling. The rate-matching attribute is used when the number of bits to be repeated or punctured is calculated, the higher the attribute the more important the bits (more repetition/less puncturing). Rate-matching attributes are only significant when compared between each other. For instance if the rate-matching attribute of a first transport channel is 2 and the rate-matching attribute of a second transport channel is 1, the first transport channel is twice as important as the second transport channel.

Since the block size is a dynamic attribute, the number of bits on a transport channel can vary between different transmission time intervals. When this happens, coded bits are repeated or punctured to ensure that the total bit rate after transport channel multiplexing is identical to the total channel bit rate of the allocated dedicated physical channels.

The rate matching adjusts the size of the transport blocks to fit the radio block based on rate matching attributes (the higher the attribute, the more important the coded bits are). For instance, if two transport blocks with the same rate matching attribute are to be sent within the same radio block, they will use half of the available payload.

The data output by the rate matching processes are multiplexed by a multiplexing process 410.

In the following example of interleaving and multiplexing transport channels, the interleaving and multiplexing will be illustrated using radio blocks comprising 12 data bits and four TFCI bits. It is to be understood that these small values are used solely to make comprehension of the present invention easier. Furthermore, the runs of each transport format would generally be much longer in a practical system than in the example described.

Figure 10:
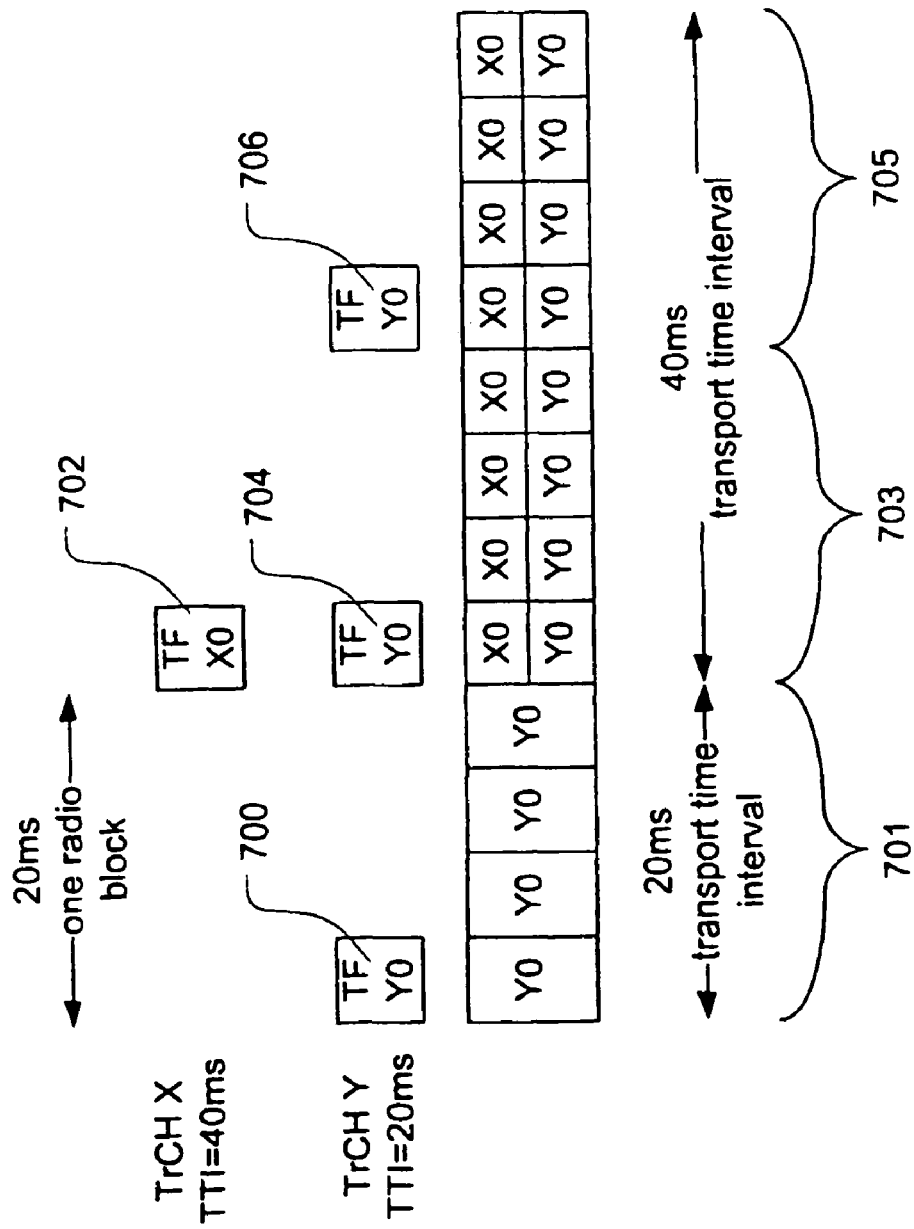
FIG. 10 illustrates a signal according to the present invention.
Figure 11A:
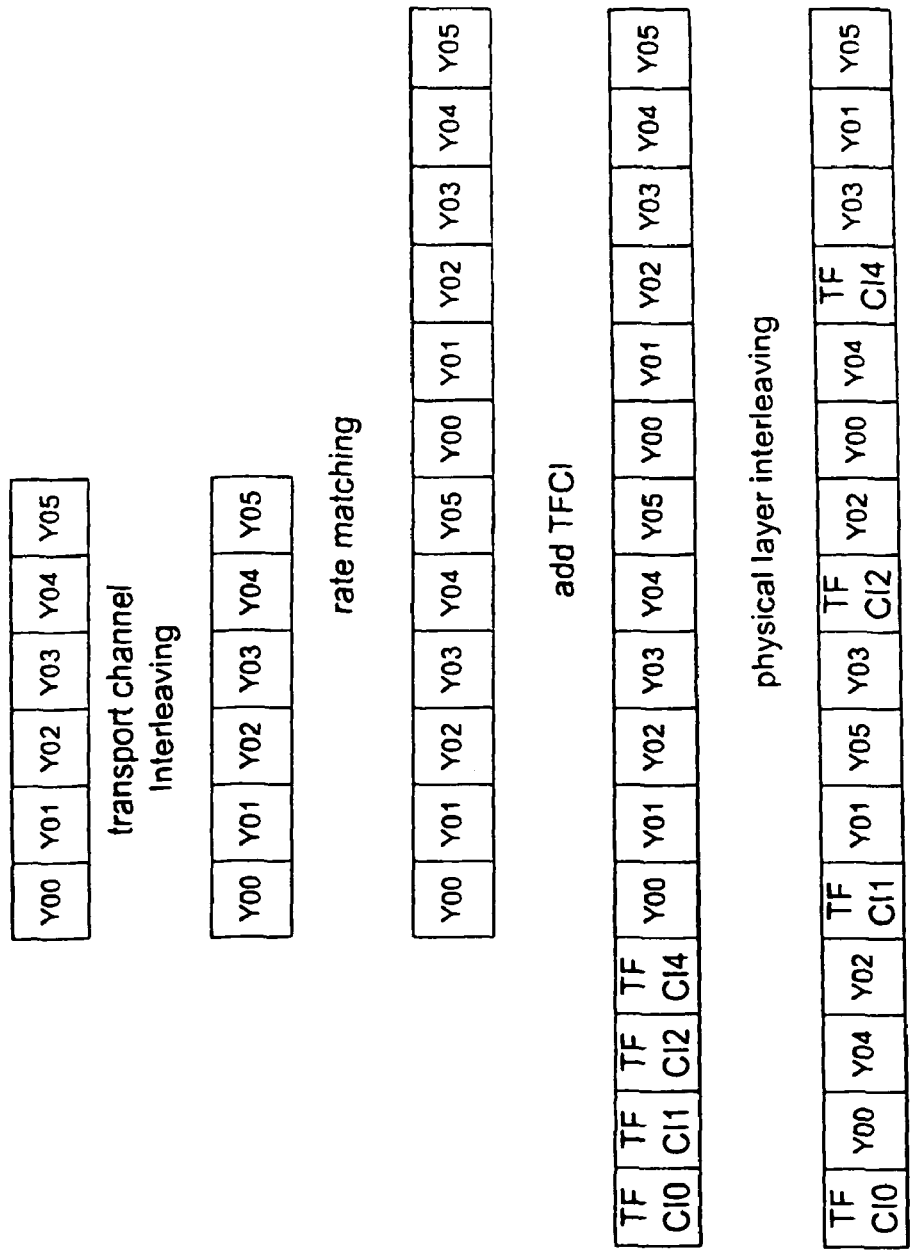
FIGS. 11(a) to (c) illustrate the formation of the radio blocks of the signal of FIG. 10.

Referring to FIGS. 10 and 11(a), a first transport block 700, belonging to a first transport channel TrCH Y, has a first transport format TFY0 and, since its transport time interval is 20 ms, which the shortest in the transport format set, is not subject to transport channel interleaving. Since a TFY0 transport block comprises six bits, rate matching is achieved by duplicating the six bits of the transport block. Although, the first transport channel TrCH Y is not subject to transport channel interleaving, it is interleaved in the physical layer interleaving described below.

Figure 11B:
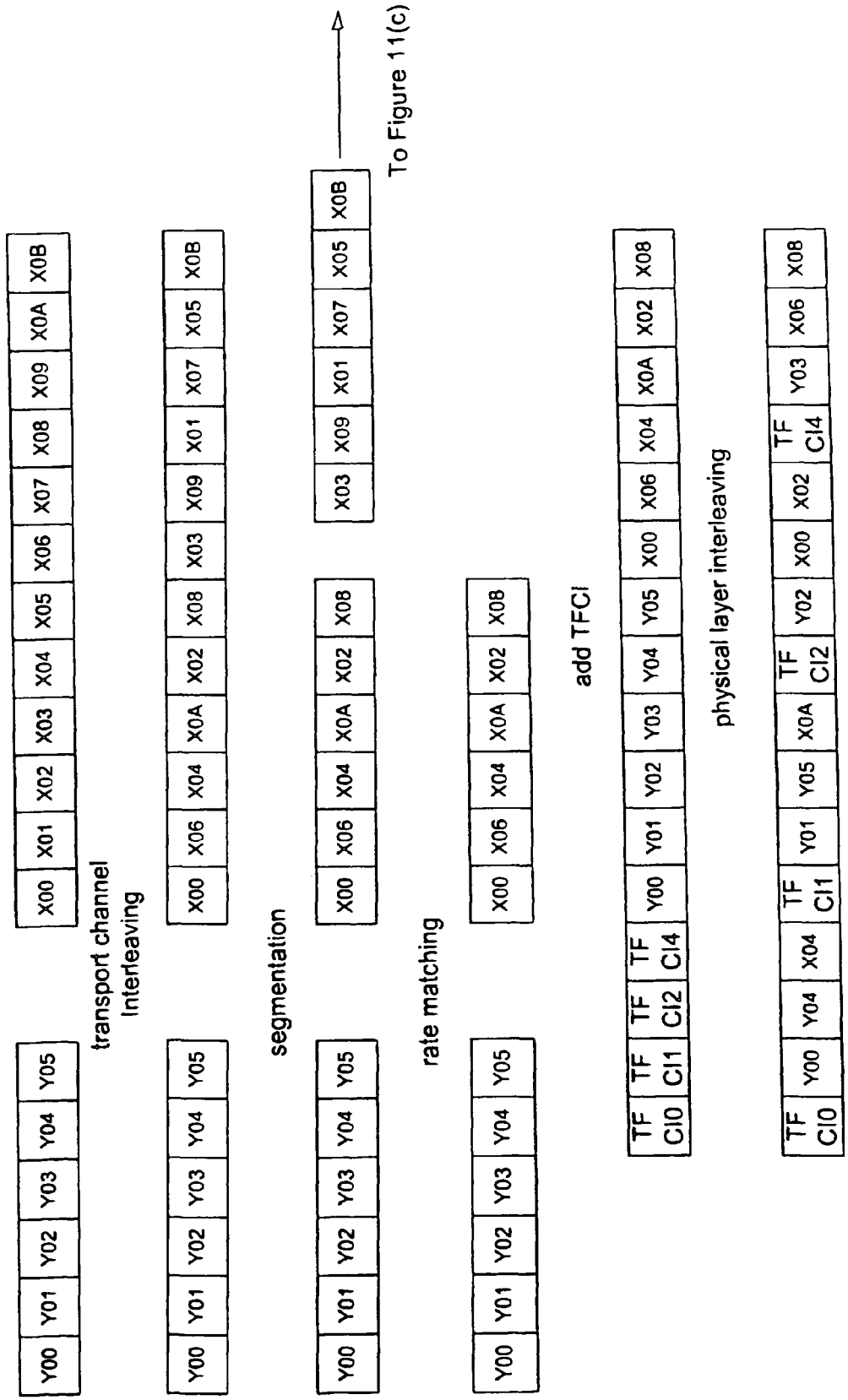

Referring to FIGS. 10 and 11(b), a second transport block 702, belonging to a second transport channel TrCH X, has a second transport format TFXO with a transmission time interval of 40 ms. Since the transmission time interval is greater than the shortest in the transport format set, the second block is subject to transport channel interleaving. The interleaved bits are then segmented with the second segment being held for transmission in the succeeding radio block 705.

A third transport block 704 using the TFY0 format is concatenated with the second transport block 702. The rate matching of the third transport block 704 does not alter the number of bits in it because it shares second radio block 703 with the first segment of the second transport block 702.

Figure 11C:
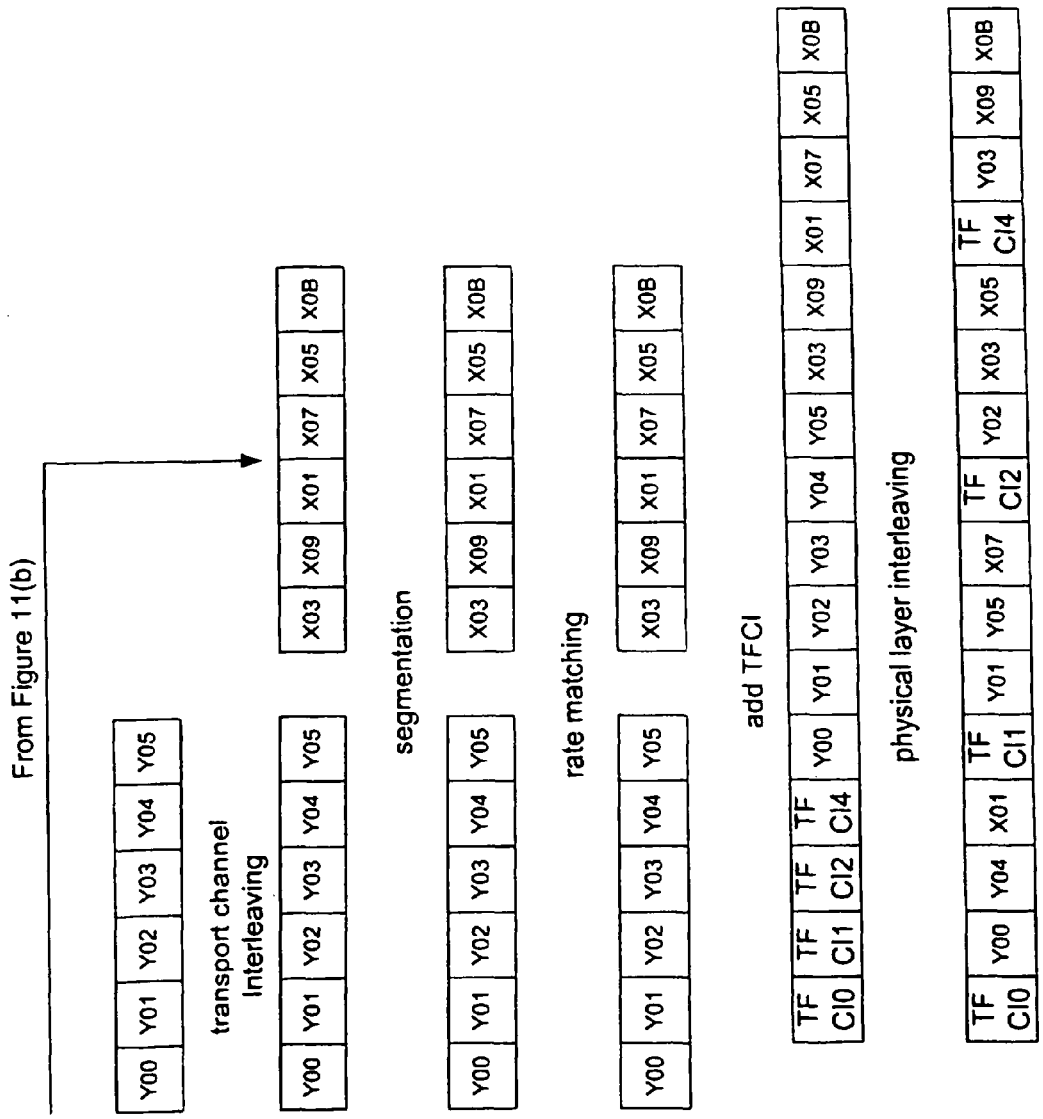

Referring to FIGS. 10 and 11(c), the second segment of the second transport block 702 is concatenated with data from a fourth transport block 706 using the TFY0 format. The fourth transport block 706 does not undergo transport channel interleaving, as in the cases of the first and third transport blocks 700, 704 and does not have its length altered by rate matching as in the case of the third transport block 704.

In the simple example used above, the rate matching is done simply by duplicating bits and it can be considered that "full rate" would involve duplication of all bits. However, the rate matching may be achieved using variable compression factors to reduce the bits required to transmit one transfer block or a part thereof.

The combined data rate produced for the transport channels 405, 406, 407 must not exceed that of physical channel or channels allocated to the mobile station 6a, 6b. This places a limit on the transport format combinations that can be permitted. For instance, if there are three transport formats TF1, TF2, TF3 for each transport channel, the following combinations might be valid:

TF1 TF1 TF2
TF1 TF3 TF3 but not

TF1 TF2 TF2
TF1 TF1 TF3

A transport format combination indicator (TFCI) is generated by a transport format combination indicator generating process 412 from information from the medium access control layer and coded by a coding process 413. The transport format combination indicator has the same block size for a given connection. The size is depending on the number of allowed transport format combinations and is configured at call set-up or a reconfiguration process such as handover. The transport format combination indicator is prepended to the data flow (FIGS. 11(a) to 11(c)) by a transport format combination indicator insertion process 411 after the multiplexing process 410 which concatenates data from different transport channels.

The output of the transport format combination indicator insertion process 411 is subjected to physical layer interleaving 414, which may be block or diagonal although block interleaving is shown in FIGS. 11(a) to 11(c). The depth of the physical layer interleaving is set to the shortest transmission time interval in the transport channel format set established during call set up. In the example shown in FIGS. 11(a) to (c), the smallest transport time interval is 20 ms, i.e. one radio block, and the physical layer interleaving is a block interleaving process applied to the data in one radio block. The physical layer interleaving does not change unless the set of transport formats changes which requires interaction between the mobile station 6a, 6b and a base station 4.

The location of data for each transport channel within the multiplexed bit stream can be determined by a received station from the transport format combination indicator and knowledge of the multiplexing process which is deterministic. Since, the physical layer interleaving scheme is known by the receiving station and the location of the transport format combination indicator in the uninterleaved radio block, the transport format combination indicator can be easily recovered, enabling separation and decoding of the transport channels.

It will be appreciated that the above-described embodiments may be modified in many ways without departing from the spirit and scope of the claims appended hereto.

The invention claimed is:

1. A mobile phone comprising:
a transmitter for transmitting blocks of digital data, the transmitter comprising radio transmitter circuitry and processing means, the processing means including a memory storing data representing a set of processing manners, said data defining a block size and a transmission time therefor for each processing manner, wherein the processing means is configured to:
process at least one data flow, the or each data flow being processed according to manners selected from said set of processing manners;
concatenate data from the or each data flow and a code identifying said selected manner or manners to produce a block of concatenated data;
interleave said block; and
transmit said block,
wherein the depth of said interleaving corresponds to a transmission time not greater than the least of said defined transmission times.

2. A transmitter according to claim 1, wherein said defined transmission times are integer multiples of the transmission time corresponding to said interleaving depth.

3. A transmitter according to claim 1, including a receiving means for receiving a signal defining said set of processing manners.

4. A transmitter according to claim 3, wherein the processing means includes a memory storing data representing a plurality of processing manners and the processing means is configured for selecting from said stored data in response to said signal defining said set of processing manners.

5. A transmitter according to claim 1, wherein each processing manner includes an interleaving process definition.

6. A transmitter according to claim 5, wherein the processing means is configured such that the interleaving according to an interleaving process definition is only performed if the transmission time of the same processing manner is greater than the least of the transmission times of said set.

7. A base station for a mobile phone network, comprising:
a transmitter for transmitting blocks of digital data, the transmitter comprising radio transmitter circuitry and processing means, the processing means including a memory storing data representing a set of processing manners, said data defining a block size and a transmission time therefor for each processing manner, wherein the processing, means is configured to:
process at least one data flow, the or each data flow being processed according to manners selected from said set of processing manners;
concatenate data from the or each data flow and a code identifying said selected manner or manners to produce a block of concatenated data:
interleave said block; and
transmit said block,
wherein the depth of said inverleaving corresponds to a transmission time not greater than the least of said defined transmission times.

8. A method of operating a mobile phone, comprising:
transmitting a block of digital data using radio transmitter circuitry, said transmitting comprising:
establishing data representing a set of processing manners, said data defining a block size and a transmission time therefor for each processing manner,
processing at least one data flow, the or each data flow being processed according to manners selected from said set of processing manners;
concatenating data from the or each data flow and a code identifying said selected manner or manners to produce a block of concatenated data;
interleaving said block; and
transmitting said block,
wherein the depth of said interleaving corresponds to a transmission time not greater than the least of said defined transmission times.

9. A method according to claim 8, wherein said defined transmission times are integer multiples of the transmission time corresponding to said interleaving depth.

10. A method according to claim 8, including receiving a signal defining said set of processing manners.

11. A method according to claim 10, including storing data representing a plurality of processing manners and selecting from said stored data in response to said signal defining said set of processing manners.

12. A method according to claim 8, wherein each processing manner includes an interleaving process definition.

13. A method according to claim 12, wherein interleaving according to an interleaving process definition is only performed if the transmission time of the same processing manner is greater than the least of the transmission times of said set.

14. A method of operating a base station for a mobile phone network, comprising:
transmitting a block of digital data using radio transmitter circuitry, said transmitting comprising:
establishing data representing a set of processing manners, said data defining a block size and a transmission time therefor for each processing manner,
processing at least one data flow, the or each data flow being processed according to manners selected from said set of processing manners;
concatenating data from the or each data flow and a code identifying said selected manner or manners to produce a block of concatenated data;
interleaving said block; and
transmitting said block,
wherein the depth of said interleaving corresponds to a transmission time not greater than the least of said defined transmission times.

* * * * *

UNITED STATES PATENT AND TRADEMARK OFFICE
CERTIFICATE OF CORRECTION

PATENT NO. : 7,848,304 B2  
APPLICATION NO. : 10/523616  
DATED : December 7, 2010  
INVENTOR(S) : Bysted et al.

Page 1 of 1

It is certified that error appears in the above-identified patent and that said Letters Patent is hereby corrected as shown below:

On the Title page, item (87) PCT Pub. No.: delete "WO02/093817" and insert -- WO04/015909 --, therefor.

On the Title page, item (87) PCT Pub. Date: delete "Nov. 21, 2002" and insert -- Feb. 19, 2004 --, therefor.

Column 10, line 2, Claim 7, delete "processing," and insert -- processing --, therefor.

Column 10, line 8, Claim 7, delete "data:" and insert -- data; --, therefor.

Signed and Sealed this  
Eighteenth Day of December, 2012

David J. Kappos  
*Director of the United States Patent and Trademark Office*